United States Patent [19]
Ho

[11] 4,445,004
[45] Apr. 24, 1984

[54] KEY TELEPHONE LINE CIRCUIT WITH IMPROVED HOLD CIRCUIT

[75] Inventor: Paul Y. Ho, Calgary, Canada

[73] Assignee: Northern Telecom Limited, Montreal, Canada

[21] Appl. No.: 381,080

[22] Filed: May 24, 1982

[51] Int. Cl.³ ............................................. H04Q 5/18
[52] U.S. Cl. ............................ 179/99 H; 179/99 LC; 179/81 R
[58] Field of Search ............... 179/99 H, 99 LC, 81 R

[56] References Cited
U.S. PATENT DOCUMENTS

| | | | |
|---|---|---|---|
| 3,436,488 | 4/1969 | Barbato et al. ................ | 179/99 LC |
| 3,647,983 | 3/1972 | Fitzsimmons .................. | 179/99 LC |
| 3,748,403 | 7/1973 | Schartman et al. ............ | 179/99 LC |
| 4,351,987 | 9/1982 | Feil .................................. | 179/99 H |

Primary Examiner—Stafford D. Schreyer
Attorney, Agent, or Firm—F. P. Turpin

[57] ABSTRACT

The line circuit of the invention uses only two multiple contact relays. The hold function is controlled with a reed relay having a single contact pair as well as three diodes whereas the line relay is only required to have a single contact pair.

1 Claim, 1 Drawing Figure

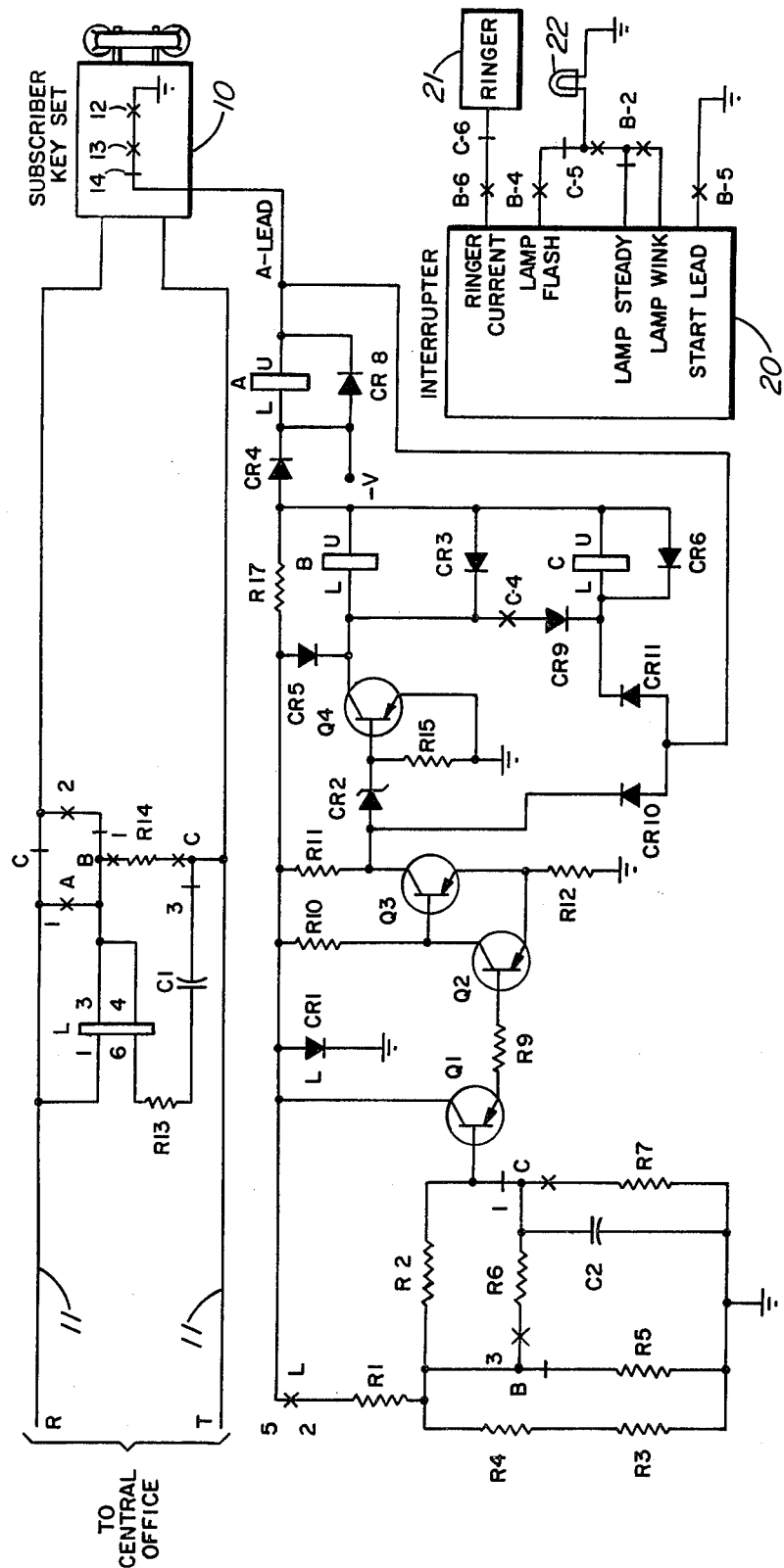

KEY TELEPHONE LINE CIRCUIT WITH IMPROVED HOLD CIRCUIT

This invention relates generally to key telephone systems and more particularly to an improved line circuit for such a system.

DESCRIPTION OF THE PRIOR ART

Key telephone systems are customer controlled switching systems which permit using subscriber station sets for a plurality of telephone lines by allowing selective switching from one line to another. In addition to the switching system performs a plurality of control and supervisory functions necessary to allow the utilization of a plurality of telephone lines by each multiline telephone set.

Typically, each line controllable by a multiline subset has associated therewith a line card usually located at the subscriber station. Each line card contains the necessary circuitry to perform all the required switching and supervisory operations required by its associated line no matter how many station sets have acces to the line. These functions include audibly and/or visibly signalling a subscriber station in response to the detection of a ringing signal from a central office or PBX switching point; placing a line in use in a hold condition so that the controlling party may use his subset for another line or intercom facility without losing his call; sensing the abandonment of an incoming call and thereafter clearing the abandoned line to make it available for further use; answering an incoming call by allowing a subset connection to the incoming call line; and allowing call origination from the subscriber station by effecting seizure of the selected line.

The most common type of line card utilizes four or more relays both to sense the presence of ringing signals incident to an incoming call and to perform the many required switching and holding operations. An example of such a circuit is described in U.S. Pat. No. 3,436,488 issued to Barbato et al and assigned to Bell Telephone Laboratories Incorporated. An improved version of that circuit is described in U.S. Pat. No. 3,748,403 issued in July 1973, to Schartman et al and assigned to the same assignee as the present invention.

Since the business community utilizes a very large number of key telephone units and associated lines, great effort has been directed towards increasing the reliability and reducing the complexity and cost of such line circuits. Basically, the cost of a key telephone line circuit is directly related to the cost of the relays employed therein. Because of the complexity of the switching function to be performed, the relays in the present line circuits are each required to have a plurality of transfer contacts. Therefore, any reduction in the number of multiple contact relays used in a line circuit results in significant cost effectiveness for the unit. One such circuit is described in U.S. Pat. No. 3,647,983 issued Mar. 7, 1972 to Fitzsimmons et al and assigned to Sandbar Electronics Corporation. However, in that circuit, the line relay is connected in line with the tip and ring subscriber loop to monitor the line current during the busy or seized condition. To some telephone operating companies, this is not an acceptable practice.

DESCRIPTION OF THE INVENTION

The circuit of the invention provides a line circuit for use in a key telephone system having only two multiple contact relays and wherein the line relay is required to have only one contact pair and is not connected in line with the subscriber loop during the busy condition. The functions priorly achieved by one of the multiple contact relays are now performed with a reed relay having a single contact pair and a plurality of diodes. The circuit of the invention provides a significant cost advantage over the previous circuit as well as improved switching action.

An example embodiment of the invention will now be described in conjunction with the drawing which is a block diagram and schematic of a line circuit constructed in accordance with the present invention.

In the circuit illustrated in the single drawing, a subscriber's telephone subset 10 which is representative of one of a plurality in a key telephon system is shown connected to the T and R leads of a subscriber loop 11. The subscriber loop 11 would in turn be connected to a central office or, as an alternative, to a private branch exchange (PBX). The subset 10 includes make contacts 12 actuated by the switch hook, make contacts 13 actuated by a line selector key and break contacts actuated by a hold key 14. The basic elements of the line circuit include a dual-winding line relay L having a pair of make contacts, control relays B and C having a plurality of transfer contacts and control relay A which, in accordance with the invention, is a small reed relay having only a pair of make contacts. The circuit also includes a timing circuit comprised of capacitor C2 and associated resistors R1 to R7, and a trigger circuit which includes transistors Q1, Q2, Q3, and Q4. As will become apparent from the following description, various contacts of the relays B, C and L (identified by an associated number) as well as diodes CR9, CR10, and CR11 are utilized to control the timing and trigger circuits as well as an interrupter circuit 20 which includes local signalling devices such as a ringer 21 and a station lamp 22. The detailed structure of the line circuit will become readily apparent from the following circuit description of its function and operation during the four basic operation states: idle, ringing, busy and hold.

IDLE STATE

When the line circuit is in the idle state, all of the relays A, B, C, and L are in the non-operated state. Transistors Q1, Q2 and Q4 are off and transistor Q3 is held on by the base current supplied through CR4 and resistors R17 and R10. The collector of the transistor Q3 is coupled to the base of the transistor Q4 through a zener diode CR2. During this period, the latter is held in a non-conducting state because the voltage across it is below the zener or breakdown voltage. Consequently, the transistor Q4 is turned off. With both relays B and C in the unoperated condition, no signal currents from the interrupter 20 are connected to either the ringer 21 or the station lamp 22.

RINGING STATE

When AC ringing signals are received from the central office on the T and R leads of the subscriber loop 11, ringing current flows from the R lead through the series connected primary and secondary windings of relay L, resistor R13, capacitor C1 and break contacts C-3 to the T lead causing the relay L to operate on each half cycle. Operation of the line relay L in response to the ringing current causes its make contacts L2-5 to pulse at twice the ringing frequency. Consequently, capacitor C2 charges via L relay contacts L2-5, resistors R1 and R2 and discharges through resistors R2 and R5. Resistors R3 and R4, which are in parallel with resistor R5, have a negligible effect during this period due to their relatively high resistance. If a true ringing signal is received on the susbcriber loop 11, the line relay L will pulse its operated time much longer than the release time and the capacitor C2 will charge to a potential which depends on the duty cycle of the line relay L. As the voltage across the capacitor C2 increases, transistors Q1 and Q2 will turn on causing transistor Q3 to turn off due to the Schmitt trigger action of the latter two. Consequently, the voltage at the collector of the transistor Q3 rises towards the supply voltage and the zener diode CR2 will start to conduct and turns on transistor Q4. This, in turn causes the relay B to operate. Because of the symmetry of the detection circuit, its operation will be the same when ringing voltage is applied on the line with the ring side grounded. Relay B operated causes ground to the connected to the start lead of the interrupter 20. Typically, this occurs after a time delay of about 310 milliseconds following receipt of the ringing signals. In addition, local ringing current from the interrupter 20 is connected through the make contacts B-6 and the break contacts C-6 to the ringer 21. Also, lamp flashing current is connected to the station lamp 22 causing it to flash at a predetermined rate.

The transistors Q2 and Q3 are connected as a conventional Schmitt trigger with a large hysterisis to insure that any ripple from the DC supply will not affect the circuit operation.

The actuation of the B relay causes the capacitor C2 to be charged through resistors R1 and R6. If the call is abandoned and the ringing current from the central office ceases, the relay L will stop pulsing and the capacitor C2 will discharge through resistors R6, R3 and R4. As the capacitor C2 discharges, transistors Q1 will turn off causing transistor Q4 to stop conducting which releases the control relay B and the circuit returns to the idle state.

BUSY STATE

When the telephone subset goes off-hook in response to an incoming call or at the initiation of an outgoing call, ground is applied through the hook switch 12, the depressed selector key 13 and the hold key 14 to operate the relay A via the A-lead. The ground condition on the A-lead is applied to the C relay via diode CR11, causing it to operate, and to the anode of zener diode CR2 via diode CR10, causing transistor Q4 to turn off and hence relay B to become unoperated. It will be appreciated that the response to the ground condition on the A-lead is practically instantaneous since the only delay is the switching time of diodes CR10 and CR11. The operation of contacts C-2 and A-1 maintains a metallic path along the R lead from the central office to the telephone subset 10. Operation of contacts C-1 causes capacitor C2 to discharge through resistor R7 subsequently turning off transistor Q1. The call waiting signals are terminated as the ringer 21 is disconnected by contacts C-6 and the lamp 22 is disconnected from its flashing condition by the operation of contacts B-4 and connected to the lamp steady condition through contacts C-5 and B-2.

HOLD STATE

When the telephone set 10 is off-hook, actuation of the hold key 14 releases relay A by removing the ground condition from the A-lead. Line current from the central office on the R lead will now flow through the line relay L causing it to operate. The actuation of make contacts L2-5 connects the power supply lead to the base of transistor Q1 through resistors R1 and R2 causing it to turn on which in turn causes Q3 to turn off and Q4 to turn on thereby operating relay B and maintaining relay C operated through diode CR9. Relay C remains operated because it release time is longer than the switching time of transistors Q1-Q4. When relay B operates, it causes transfer contacts B-1 to actuate, thereby switching the holding current for relay L through a bridging resistor R14 and contacts C-3. The operation of the B relay starts the interrupter 20 by grounding the start lead through the make contacts B-5. Concurrently, lamp wink current from the interrupter 20 is connected through the make portion of transfer contacts C-5 and the make portion of transfer contacts B-2 to the station lamp 22. The capacitor C2 will now rapidly charge through the make contacts L2-5, resistors R1 and R6 and the make portion of transfer contacts B-3.

Any station of the key telephone system that seizes the held line by operating the associated station key and going off-hook will cause relay A to operate thereby causing relay B to be released due to the ground condition on the A-lead applied to the collector of transistor Q3 through diode CR10. Relay C is maintained operated due to the ground condition applied through diode CR11. With relay B released and relays A and C operated, relay L is released and the bridging impedance is disconnected. Also, the interrupter 20 is turned off to terminate the visual signalling. The line circuit is thus restored to the busy state.

What is claimed is:

1. A line circuit for use in a key telephone system comprising a ringing detection circuit, including a line relay, for detecting an incoming call; a busy state circuit, including a pair of relay B and C, responsive to the called station going off-hook for establishing a talking path between the subscriber loop input of the line circuit and the called station and for controlling the generation of audible and visual signals at the called station; and a hold circuit responsive to the depression of a hold key at the called station for terminating the subscriber loop with a holding bridge thereby insuring that the called station line is held in a seized condition and for generating at the called station a visual indication of such a condition; characterized in that the hold circuit comprises, a reed relay (A) having a single pair of make contacts, the read relay being connected between a source of power and ground via an A-lead connected to switching contacts of a hold key and of the subscriber set, the reed relay being responsive to the operation of the hold key for causing the holding bridge to be connected across the subscriber loop, a first diode (CR10) connected between the A-lead and the control circuit of relay B for forcing it to release when the incoming call is answered, a second diode (CR9) connected between the B and C relays for holding the latter operated when the hold key is operated, and a third diode (CR11) connected between the A-lead and the C relay for holding it operated during the busy condition.

* * * * *